(12) United States Patent
Yard et al.

(10) Patent No.: US 11,708,060 B2
(45) Date of Patent: Jul. 25, 2023

(54) ELECTRIFIED POWERTRAIN WITH CENTRALIZED POWER DISTRIBUTION STRATEGY AND DECENTRALIZED INVERTERS

(71) Applicant: GM GLOBAL TECHNOLOGY OPERATIONS LLC, Detroit, MI (US)

(72) Inventors: Matthew Yard, Milford, MI (US); Krunal P. Patel, South Lyon, MI (US); Karthikeyan Palanichamy, Farmington Hills, MI (US); Luke D. Shepley, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 152 days.

(21) Appl. No.: 17/165,145

(22) Filed: Feb. 2, 2021

(65) Prior Publication Data
US 2022/0242387 A1 Aug. 4, 2022

(51) Int. Cl.
*B60W 10/08* (2006.01)
*B60W 10/119* (2012.01)

(52) U.S. Cl.
CPC .......... *B60W 10/08* (2013.01); *B60W 10/119* (2013.01); *B60W 2510/083* (2013.01); *B60W 2710/083* (2013.01)

(58) Field of Classification Search
CPC ............... B60W 10/08; B60W 10/119; B60W 2510/083; B60W 2710/083

USPC .......................................................... 701/22
See application file for complete search history.

(56) References Cited

U.S. PATENT DOCUMENTS

| | | | | |
|---|---|---|---|---|
| 2011/0087395 A1* | 4/2011 | Yamamoto | ............ | B60W 10/26 701/22 |
| 2014/0350803 A1* | 11/2014 | Ye | ......................... | B60W 20/10 701/51 |
| 2017/0166203 A1* | 6/2017 | Sugai | .................. | B60W 10/184 |
| 2020/0346632 A1* | 11/2020 | Gruner | .................. | B60W 10/06 |

* cited by examiner

*Primary Examiner* — Yi-Kai Wang
(74) *Attorney, Agent, or Firm* — Quinn IP Law (57) ABSTRACT

A method for distributing electrical power to electric motors in an electric powertrain, in which the electric motors are electrically connected to a shared power supply, includes receiving input signals via a supervisory controller. The input signals include a total torque request of the electric powertrain and electrical limits of the power supply. The method includes determining an open-loop torque command for each respective motor in response to the input signals. In response to the total torque request and the power supply limits, the controller also determines maximum and minimum power limits of motor, with the maximum and minimum power limits including a calibrated power reserve for executing a predetermined torque operation. The method includes transmitting the open-loop torque command and the power limits to a respective motor control processor of each motor to thereby control the torque operation.

18 Claims, 6 Drawing Sheets

ELECTRIFIED POWERTRAIN WITH CENTRALIZED POWER DISTRIBUTION STRATEGY AND DECENTRALIZED INVERTERS

INTRODUCTION

Rotary electric machines are used in electric powertrains of motor vehicles and other electric drive systems to generate or receive torque in different operating modes. In a radial flux-type electric machine having a rotor and a wound stator, the rotor is circumscribed by the stator and separated therefrom by a radial airgap. The rotor and an integrally-connected rotor shaft rotate in unison when the stator's field windings are sequentially energized by an alternating current (AC) output voltage from a power inverter, which in turn is electrically connected to a direct current (DC) power supply, such as a high-voltage battery pack or a fuel cell. Within the power inverter, respective ON/OFF conductive states of individual semiconductor switches are controlled using pulse width modulation or another application-suitable switching control technique to generate the AC output voltage, with the power inverter also being capable in some configurations of performing a DC-to-AC conversion operation, e.g., in a power generating operating mode.

SUMMARY

Disclosed herein are systems, associated control logic, and methods for controlling operation of multiple polyphase/alternating current (AC) rotary electric machines within an electric powertrain having a high-voltage direct current (DC) power supply. Each respective one of the electric machines, referred to hereinafter as electric motors for simplicity irrespective of whether the electric machine is acting as a motor or an electric generator, has a respective traction power inverter module (TPIM) and associated local motor control processor (MCP). Together, the TPIM and MCP of a given one of the electric motors locally and independently control a torque operation of the electric motor.

In the disclosed configurations, DC sides of the various TPIMs are electrically connected to the shared DC power supply via a DC voltage bus, such that electrical power from the power supply when discharging is shared among the various electric motors. Likewise, electrical power supplied from the various electric motors, when acting in a regenerating capacity, i.e., as electric generators, is supplied to the common/shared power supply in a charging mode. Power sharing as contemplated herein thus occurs during both charging and discharging modes of operation.

Within the scope of the present disclosure, a centralized supervisory controller is used to calculate a total required power level to or from the electric powertrain as a whole, i.e., the collective set of electric motors and their associated TPIMs and MCPs. Although the various examples set forth herein rely on electric propulsion, those skilled in the art will appreciate that hybrid powertrain embodiments may be used within the scope of the disclosure, with such embodiments utilizing an internal combustion engine as a possible torque source. The supervisory controller thereafter distributes the calculated total required power to the individual TPIMs and MCPs, compensating as needed for available engine torque in non-limiting exemplary hybrid powertrain configurations.

As used herein, the term "distributes" refers to the allocation or reservation of a motor-specific portion of a total available amount of electrical power from the shared power supply, itself exemplified herein as a multi-cell battery pack without limitation, with control and electrical switching actions ensuring that each one of the electric motors receives no more than its distributed portion. The centralized open-loop approach, followed by local execution of a particular torque operation by the TPIMs and MCPs, allows for implementation of a simplified decentralized motor control strategy in a manner that protects the shared power supply and associated power electronic hardware.

As appreciated in the art, within a decentralized electrical system, a shared power supply of the type contemplated herein, i.e., one whose total electrical power capability is shared by the various electric motors of the electric powertrain, acts as a non-linear constraint. The present control strategy is intended to simplify individual motor drivetrain controls under such a constraint by providing, via operation of the supervisory controller, a respective required power level and open-loop torque command for execution by each respective one of the TPIMs and associated MCPs.

The required power levels within the present strategy include a minimum reserve power margin, which is calculated by the supervisory controller using open-loop control logic. The reserve power margin used herein is sufficient for ensuring that sufficient power remains for locally performing a predetermined fast actuator task, e.g., active damping, lash compensation, or wheel-flare mitigation in a few non-limiting embodiments. The present solution thus enables an independent supervisory control strategy that intelligently distributes electrical power across multiple decentralized MCPs and TPIMs, with or without an accompanying engine as noted above.

In particular, a method is disclosed herein for distributing electrical power to a plurality of electric motors in an electric powertrain in which the electric motors are electrically connected to a shared power supply and locally controlled by respective MCPs. According to an exemplary embodiment, the method includes receiving input signals via a supervisory controller, with the input signals including a total torque request of the electric powertrain and a set of electrical limits of the shared power supply. The method includes determining an open-loop torque command for each respective one of the electric motors, via the supervisory controller, in response to the input signals.

The method in this embodiment also includes determining, via the supervisory controller in response to the total torque request and the electrical limits, maximum and minimum power limits for operation of each respective one of the electric motors. The power limits include a predetermined reserve power margin for executing a predetermined torque operation, which may consider available power from an optional engine as noted above, e.g., when a particular drive axle is powered by a hybrid engine-motor configuration. The open-loop torque commands and the maximum and minimum power limits are then transmitted to the respective MCPs to control the torque operation.

Receiving the input signals via the supervisory controller may include, as the set of electrical limits of the shared power supply, a power limit, a voltage limit, and a current limit of the shared power supply.

Determining the open-loop torque command for each respective one of the electric motors may include calculating a total torque vector for the electric powertrain in response to the input signals, with the total torque vector having a lateral torque component and a longitudinal torque component. In such an embodiment, the method includes applying motor torque constraints to the total torque vector to derive the open-loop toque commands.

The electric motors may be constructed as AC motors, in which case the electric powertrain includes a plurality of power inverters. The respective MCPs are each connected to a respective one of power inverters in an embodiment, with the method further including controlling the torque operation via the respective MCPs in response to the open-loop torque command and the maximum and minimum power limits.

The electric powertrain in some applications is used as part of a motor vehicle having road wheels respectively driven by a corresponding one of the AC motors. In such an embodiment, controlling the torque operation via the respective MCPs includes controlling a fast actuator control action of the motor vehicle. Controlling the fast actuator control action of the motor vehicle may include controlling an active damping maneuver, a lash mitigation maneuver, and/or a wheel-flare mitigation maneuver in a few non-limiting exemplary applications.

The shared power supply in the above-noted motor vehicle application may be embodied as a high-voltage propulsion battery pack, as noted above, with the calibrated reserve power margin for executing the predetermined torque operation being at least 5 kW in an exemplary non-limiting configuration.

An electric powertrain is also disclosed herein. The electric powertrain may include a shared power supply, a plurality of drive axles, and a plurality of electric motors, each electric motor of the plurality of electric motors being electrically connected to the shared power supply and arranged on a respective one of the drive axles. The electric powertrain also includes a plurality of MCPs. Each MCP is configured to control a dynamic state of a respective one of the electric motors. A supervisory controller of the electric powertrain is in communication with the plurality of MCPs, and is configured to execute the present method.

An embodiment of the supervisory controller is also disclosed herein for an electric powertrain having multiple electric motors electrically connected to a shared power supply and locally controlled by respective MCPs, such that each one of the multiple electric motors is controlled by a corresponding one of the MCPs. The supervisory controller includes a processor and memory on which is recorded instructions for distributing power from the shared power supply to the multiple electric motors. Execution of the instructions by the processor is configured to cause the supervisory controller to perform the present method.

The above-noted and other features and advantages of the present disclosure will be readily apparent from the following detailed description of the embodiments and best modes for carrying out the disclosure when taken in connection with the accompanying drawings and appended claims.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Figure 1:
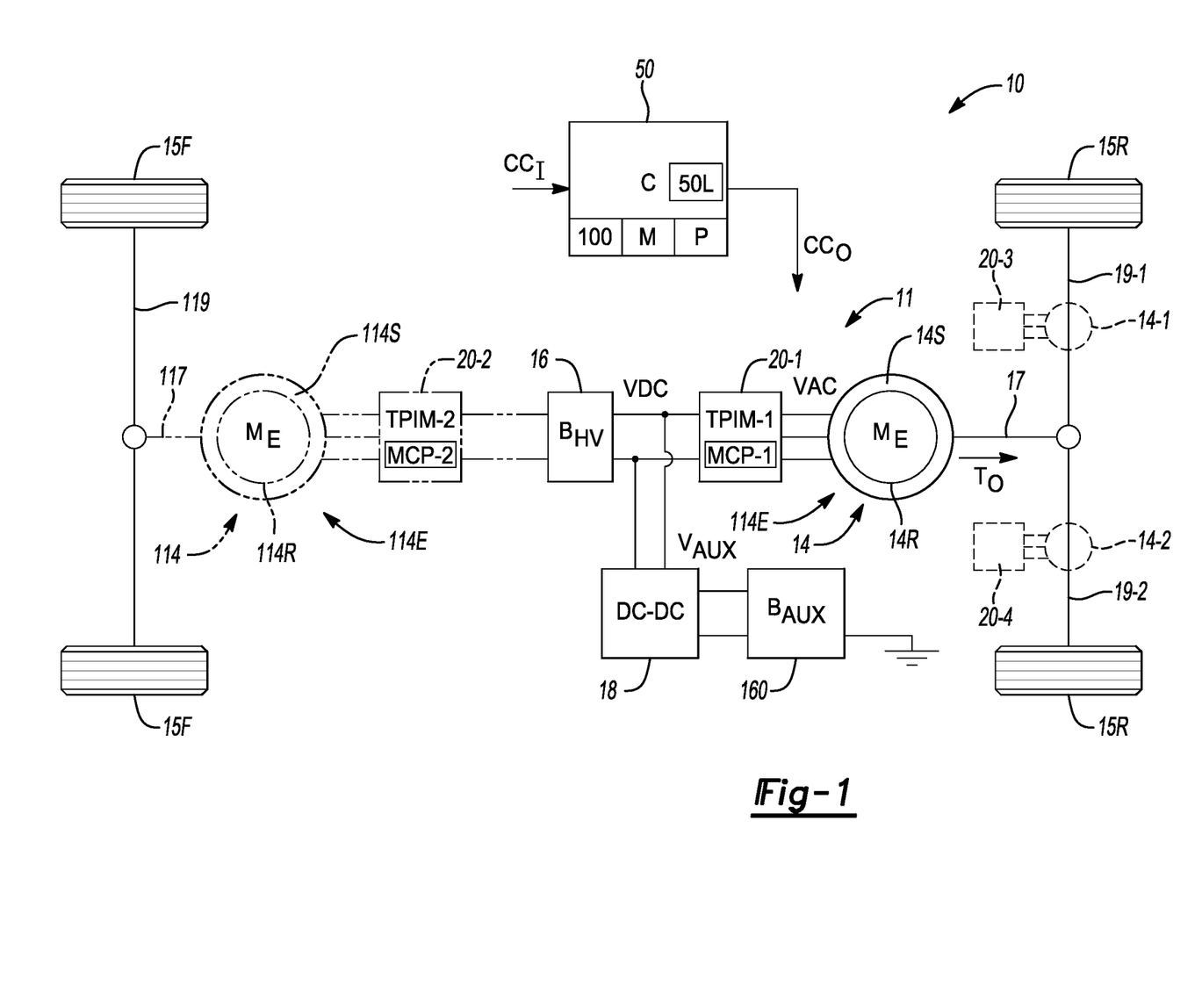
FIG. 1 is a schematic illustration of an exemplary motor vehicle having an electric powertrain with multiple rotary electric machines and a centralized supervisory controller configured to execute a feed-forward/open-loop power distribution method as set forth herein.

Referring to the drawings, wherein like reference numbers refer to like components, FIG. 1 schematically depicts a representative motor vehicle 10 having an electric powertrain 11 configured as set forth herein. The electric powertrain 11 includes a plurality of rotary electric machines, collectively hereinafter referred to as electric motors 114E for simplicity. In the illustrated exemplary vehicular application, for instance, the electric motors 114E include electric propulsion motors 14 and 114, with the latter alternatively configurable as separate electric propulsion motors 14-1 and 14-2.

Primary torque functions and fast-actuator torque operations of the electric motors 114E are regulated in real time from a centralized location via control signals (arrow $CC_O$) from a supervisory controller (C) 50. Although omitted from FIG. 1 for illustrative simplicity, the electric powertrain 11 may be alternatively configured as a hybrid electric powertrain in which an internal combustion engine (not shown) supplies engine torque. Thus, the description of the electric powertrain 11 that follows does not preclude extension to hybrid electric alternatives, as will be appreciated by those skilled in the art.

Instructions for implementing a power distribution strategy in accordance with the present disclosure collectively embody a method 100, an example of which is explained below with reference to FIG. 5. Such instructions may be recorded in memory (M) of the controller 50 and executed by one or more processors (P) thereof to provide the benefits described herein. As part of the present method 100, the controller 50 provides independent supervisory control of the electric motors 114E at least in part by automatically determining a total power requirement in response to a set of input signals (arrow $CC_I$), e.g., a driver-requested and/or autonomously determined output torque request, a fast actuator torque response as described herein, etc. The controller 50 then distributes the total power requirement to each of the electric motor 114E, or more precisely, to a corresponding local motor control processor thereof.

For illustrative simplicity and clarity, a corresponding motor control processor is abbreviated MCP-1 and MCP-2 for the electric propulsion motors 14 and 114, respectively, with the electric propulsion motors 14 and 114 being positioned as shown in FIG. 1 to function as respective rear and front drive motors. The alternative electric propulsion motors 14-1 and 14-2 may be used in other embodiments in lieu of the electric propulsion motor 14, e.g., by positioning the electric propulsion motors 14-1 and 14-2 on separate half axles 19-1 and 19-2 connected to rear road wheels 15R as shown. In either configuration, the electric propulsion motor 14 (via an output member 17) or the electric machines 14-1 and 14-2 (via a corresponding output member (not shown)), may produce and transmit an output torque (arrow $T_O$) to the rear road wheels 15R for propelling the motor vehicle 10. The electric propulsion motor 114 may be similarly coupled to front road wheels 15F via a front axle 119 and an output member 117.

Figure 2:
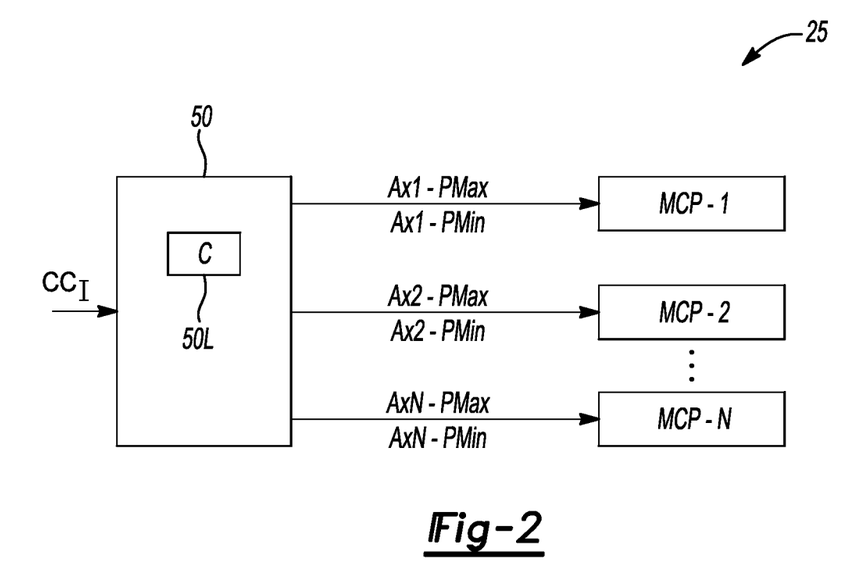
FIG. 2 is a schematic control logic diagram describing a simplified embodiment for implementing the present method in an electric powertrain having multiple electric motors each arranged on a different drive axle.

As appreciated in the art, each one of the electric motors 114E is respectively connected to a corresponding traction power inverter module (TPIM), with a TPIM 20-1 (TPIM-1) with its resident MCP-1 being connected to the electric propulsion motor 14 and a TPIM 20-2 (TPIM-2) with its resident MCP-2 being connected to the electric propulsion motor 114. Although omitted for illustrative clarity and simplicity, the optional embodiment using separate electric propulsion motors 14-1 and 14-2 on the respective half axles 19-1 and 19-2 for powering the rear road wheels 15R would likewise be equipped with respective TPIMs 20-3 and 20-4 and corresponding MCPs (not shown). Each MCP is thus configured to locally control a dynamic state of a corresponding electric propulsion motor 14, 114, 14-1, or 14-2. The MCPs accomplish this in response to the control signals (arrow $CC_O$), with each electric propulsion motor 14, 114, 14-1, and 14-2 ultimately controlled in accordance with a motor-specific portion of the control signals (arrow $CC_O$). In this manner, the supervisory controller 50 provides the necessary power with sufficient power reserves, i.e., reserve power margin, for performing individual motor-level control actions, such as but not limited to fast actuator actions such as active damping, lash mitigation, wheel flare mitigation, etc.

Figure 3:
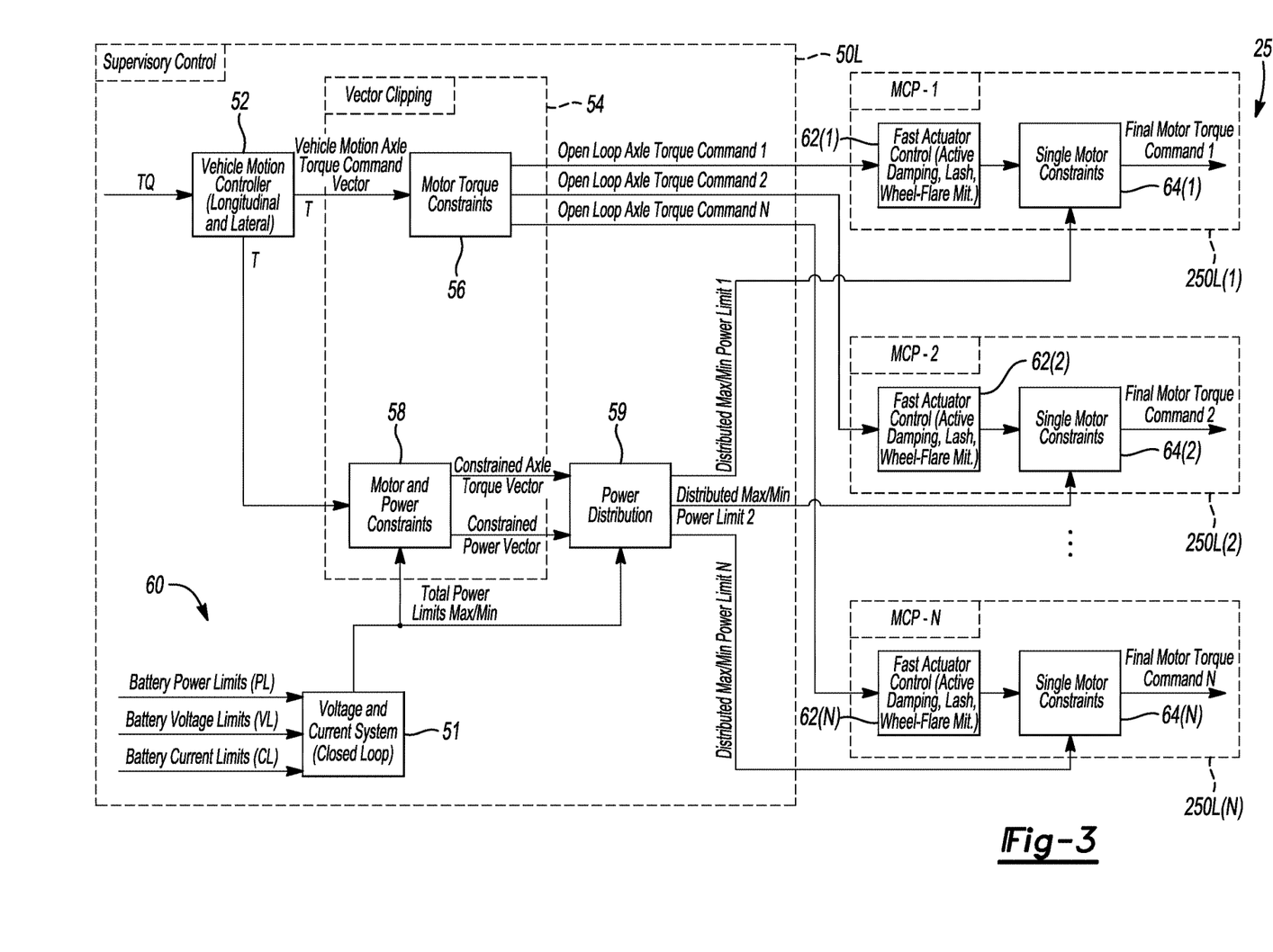
FIG. 3 is a schematic logic flow diagram depicting a possible embodiment of control logic usable for implementing the present open-loop power distribution control strategy.

The supervisory controller 50 shown schematically in FIG. 1 may be embodied as one or more electronic control units or computational nodes responsive to the input signals (arrow $CC_I$). The controller 50 includes application-specific amounts of the memory (M) and one or more of the processor(s) (P), e.g., microprocessors or central processing units, as well as other associated hardware and software, for instance a digital clock or timer, input/output circuitry, buffer circuitry, etc. The memory (M) may include sufficient amounts of read only memory, for instance magnetic or optical memory. The term "controller" as used herein for descriptive simplicity may include one or more electronic control modules, units, processors, and associated hardware components thereof, e.g., Application Specific Integrated Circuits (ASICs), systems-on-a-chip (SoCs), electronic circuits, and other hardware as needed to provide the programmed functionality. Representative control logic 50L for use in executing the method 100 of FIG. 5 and an analogous method 100A of FIG. 6 is depicted in FIG. 3 and described in detail below.

Further with respect to the representative electric powertrain 11 shown in FIG. 1, the electric propulsion motor 14 is representative of the construction of the remaining electric motors 114E, and is depicted as having a stator 14S that is coaxially arranged with respect to a rotor 14R in a radial flux-type configuration. The stator 14S thus circumscribes the rotor 14R. However, other embodiments of the electric propulsion motor 14 may be used within the scope of the disclosure, including axial flux-type machines, and therefore the simplified representative embodiment of the electric propulsion motor 14 of FIG. 1 is illustrative of just one possible construction. The electric propulsion motor 114 on the drive axle 119 powering the front road wheels 15F is similarly configured with a corresponding stator 114S and rotor 114R, with the rotor 114R connected to the output member 117 and the rotor 14R connected to the output member 17. Electric propulsion motors 14-1 and 14-2 are shown schematically in FIG. 1 for illustrative simplicity, but could likewise have a similar concentric stator and rotor configuration.

In the representative embodiment of FIG. 1, the electric motors 114E are configured as polyphase/AC devices. As is typical in automotive propulsion applications, energization of corresponding field windings (not shown) of the stators 14S and 114S, and comparable stators (not shown) of the electric propulsion motors 14-1 and 14-2, requires input power from an onboard DC power supply. To this end, the electric powertrain 11 may be equipped with a power supply 16. Although exemplified herein without limitation as a high-voltage shared battery pack ($B_{HV}$) as shown, e.g., a multi-cell rechargeable lithium-ion or nickel-metal hydride construction or other suitable battery chemistry, other embodiments of the power supply 16 may be used within the scope of the disclosure, including a fuel cell stack (not shown) or another application-suitable power supply 16. For clarity, however, the power supply 16 will be referred to hereinafter as the battery pack 16. Also, the term "high-voltage" as used herein refers to voltage levels that exceed typical 12-15V auxiliary/"low" voltage levels, with exemplary hybrid electric vehicle or full battery electric vehicle propulsion applications of the types contemplated herein possibly requiring the shared battery pack 16 to have a voltage capability of, for instance, 300V or more.

The shared battery pack 16 is electrically connected to the TPIMs 20-1 and 20-2, or TPIMs 20-1, 20-3, and 20-4, via a high-voltage direct current voltage bus (VDC), with the TPIMs 20-1 and 20-2 (or 20-1, 20-3, and 20-4) in turn being electrically connected to their respective stators 14S and 114S via a high-voltage AC voltage bus (VAC). Although omitted for illustrative simplicity, the TPIMs 20-1, 20-2, 20-3, and 20-4 are internally configured and externally controlled via ON/OFF state control of multiple dies of semiconductor switches, with such switches typically embodied as insulated gate bipolar transistors (IGBTs) or metal-oxide semiconductor field-effect transistors (MOSFETs). Thus, a DC input voltage is converted by internal switching operation of the TPIMs 20-1, 20-2, 20-3, and 20-4 into an AC output voltage suitable for powering the electric propulsion motors 14, 114, 14-1, and 14-2, respectively, in their capacities as propulsion motors. During a regenerative charging event, the TPIMs 20-1, 20-2, 20-3, and 20-4 may operate in the opposite sense, i.e., by converting an AC input voltage into a DC output voltage for recharging the constituent battery cells of the shared battery pack 16.

Other components may be included within the electric powertrain 11 of FIG. 1, such as but not limited to the illustrated DC-DC converter 18 and an auxiliary battery ($B_{AUX}$) 160. As noted above, auxiliary voltage levels are typically 12-15V, and therefore the DC-DC converter 18 is operable through internal switching operations and signal filtering, as understood in the art, to receive a relatively high DC voltage from the DC voltage bus (VDC) and output a lower auxiliary voltage ($V_{AUX}$) to the auxiliary battery 160. The electric motors 114E are therefore just some of the multiple devices requiring electrical energy from the shared battery pack 16 during ongoing discharging operations, and likewise providing electrical energy to the shared battery pack 16 during ongoing charging operations.

Referring briefly to FIG. 2, the supervisory controller 50 depicted in FIG. 1 uses the control logic 50L, exemplified in FIG. 3, to establish independent supervisory control over the various electric machines 114E, specifically via direct communication with each respective one of the MCPs collectively shown at 25 in FIG. 2. For simplicity, the MCPs 25 are nominally labeled MCP-1, MCP-2, . . . , MCP-N. In the embodiment of FIG. 1, N=3 when three electric motors are used, e.g., electric propulsion motors 114, 14-1, and 14-2, with MCP-2 and MCP-3 in this particular instance being the MCPs corresponding to the electric propulsion motors 14-1 and 14-2. Thus, the suffixes −1, −2, and −3 for the MCPs 25 in FIG. 2 are for nominal $1^{st}$, $2^{nd}$, and $3^{rd}$ axles, and thus not indicative of the particular configuration shown in FIG. 1.

In general, the supervisory controller 50 receives the input signals (arrow $CC_I$) indicative of an output torque and/or speed request. In response, the controller 50 determines maximum and minimum power requirements for the N different drive axles, i.e., Max and Min power requirements ($P_{Max}$, $P_{Min}$) for the nominal drive axles 1, 2, . . . , N, i.e., Ax1, Ax2, . . . , AxN. When N=3 as in the representative three-axle embodiment of FIG. 1, the N drive axles could correspond to drive axles 119, 19-1, and 19-2. However, other embodiments may use a different number or placement of drive axles, and therefore the FIG. 2 representation is greatly simplified for the purpose of illustrating the present teachings.

Referring to the exemplary control logic 50L of FIG. 3, axle-specific/motor-specific torque requirements as contemplated herein include minimum reserve power margins for performing necessary torque operations, possibly including fast actuator control actions such as active damping, lash mitigation, wheel-flare control, etc. The control logic 50L is used to enact the present method 100, and to allow the supervisory controller 50 to use independent feed-forward controls to distribute battery power to the MCPs 25 of FIG. 2 and associated electric motors 114E.

Figure 5:
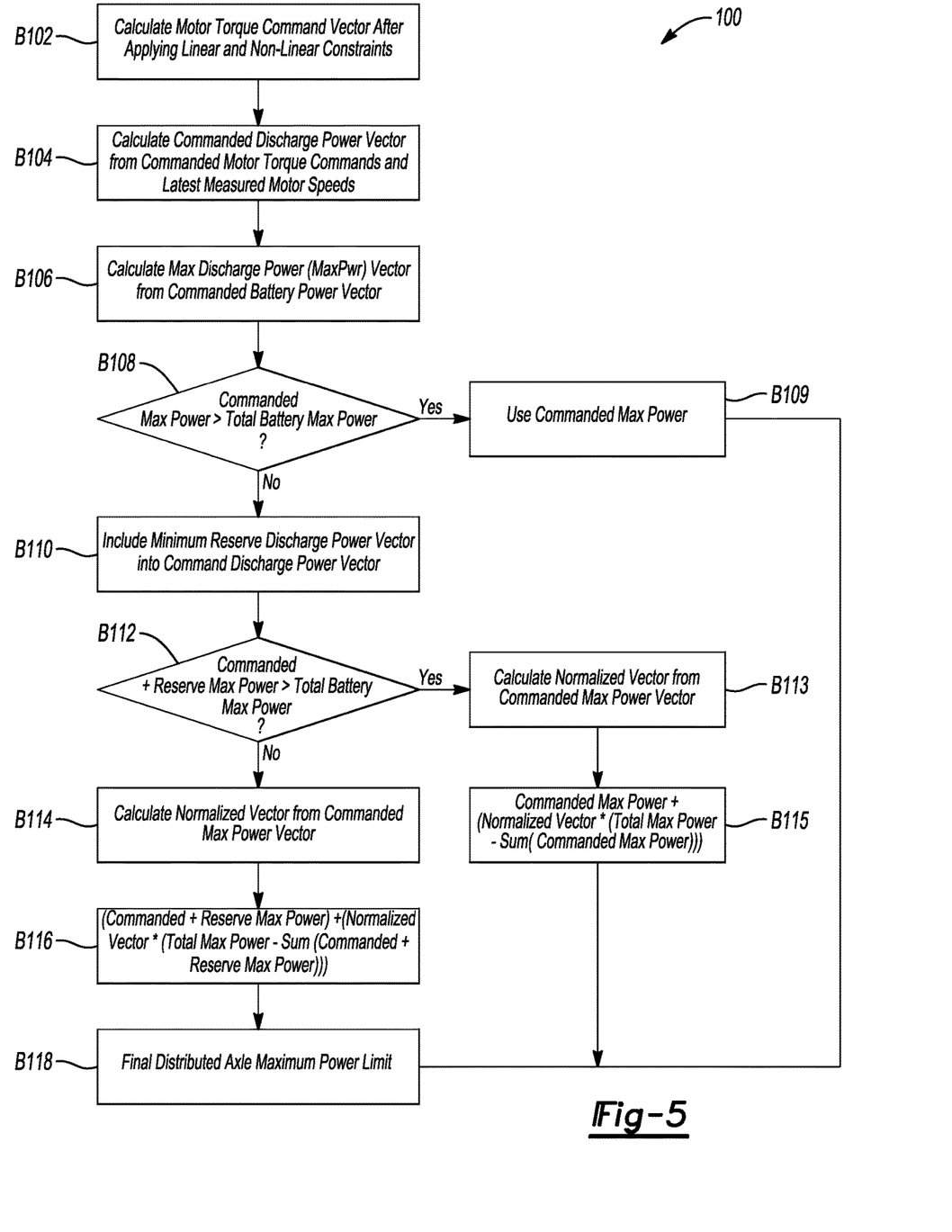
FIGS. 5 and 6 are schematic illustrations of respective discharging and charging implementations of the present method.
Figure 6:
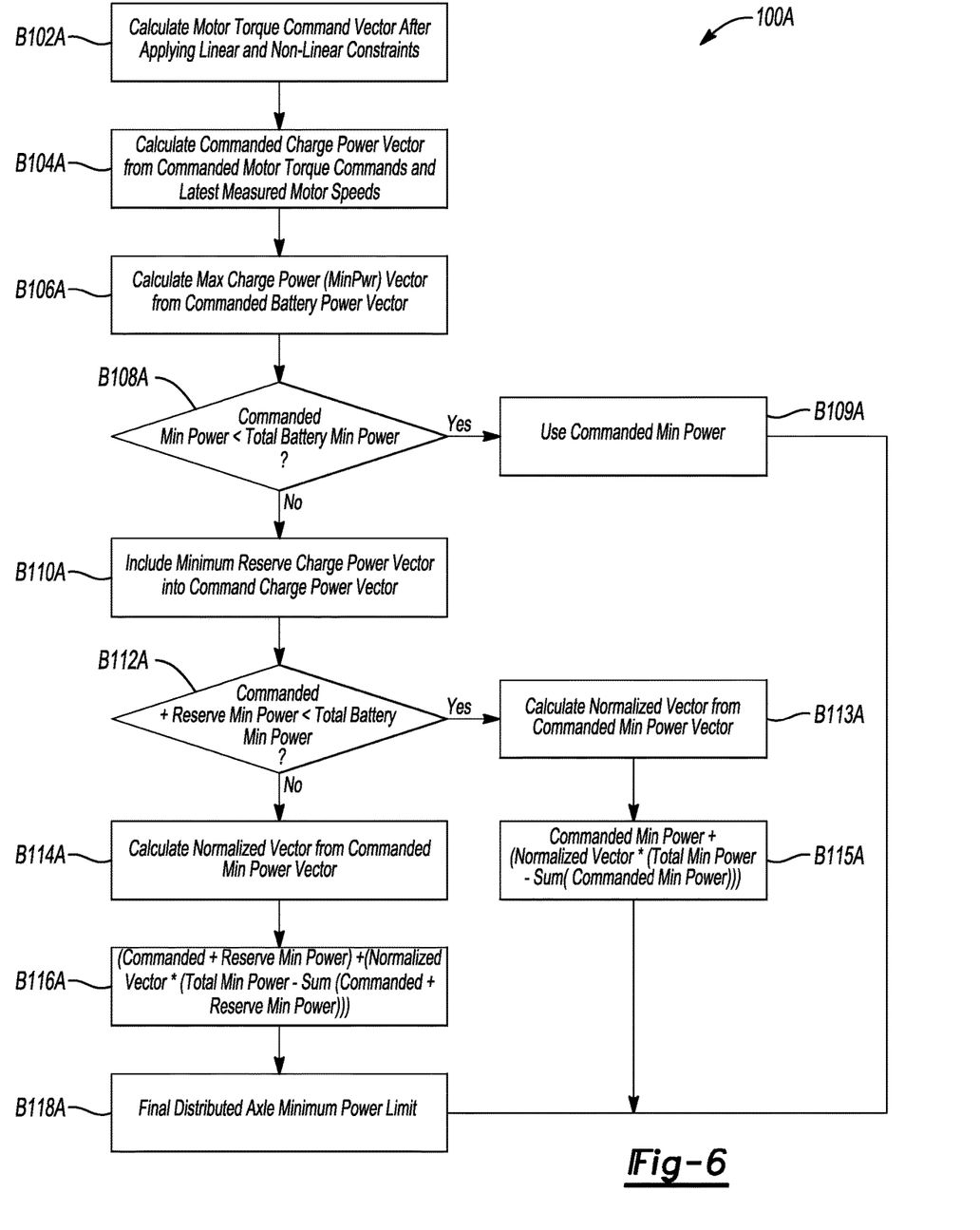

The control logic 50L of FIG. 3, and the enabled methods 100 and 100A of FIGS. 5 and 6, does not require feedback from the decentralized MCPs 25 of FIG. 2, a feature that reduces communication delay/latency issues when controlling multiple electric motors 114E from the central location of the supervisory controller 50. Likewise, the control logic 50L enables independent control of the electric powertrain 11 of FIG. 1 by the multiple electric motors 114E when using a shared power supply, in this instance the shared battery pack 16.

Driveline management actions conducted by the supervisory controller 50 can include fast actuator controls actions as noted above. As appreciated in the art, such actions are possible when performed locally by an MCP 25 collocated with the particular actuator being controlled, in this case the various electric motors 114E of FIG. 1. The present methods 100 and 100A therefore allows each MCP 25 of FIG. 2 to independently perform a local fast actuator control action for a given electric motor 114E, in part by programming the controller 50 to determine a corresponding motor-specific electric power reserve margin to apportion or distribute between the various electric motors 114E and their associated TPIMs 25.

In response to the control signals (arrow $CC_I$) of FIG. 1, the controller 50 generates and/or receives a total torque request (arrow TQ), which is a total amount of motor output torque required from the collective electric motors 114E of the electric powertrain 11. A vehicle motion control block 52 of the supervisory controller 50 processes the total torque request (arrow TQ) to generate a vehicle motion axle torque command vector, or total torque vector, abbreviated herein as T. More specifically, vehicle motion control block 52, used to derive constituent longitudinal and lateral components of the total torque request (arrow TQ), may be used for calculating and commanding the total torque vector T for the electric powertrain 11 of FIG. 1 in response to the input signals (arrow $CC_I$), with the total torque vector T having, as noted above, a lateral torque component and a longitudinal torque component.

The commanded total torque vector T is then transmitted to a vector clipping logic block 54, which is itself composed of two different logic blocks: a motor torque constraints block 56 and a motor and power constraints block 58. Within the vector clipping logic block 54, the motor torque constraints block 56 may be used to generate respective open-loop axle torque commands for the N electric machines 114E or associated axles, with nominally labeled commands 1, 2, and N shown in FIG. 3 for MCP-1, MCP-2, and MCP-N, respectively. Such open-loop axle torque commands may be used to provide an initial motor-specific torque request to a corresponding one of the electric motors 114E of FIG. 1, such as for performing a particular fast actuator control action of the exemplary types noted above.

At the same time, motor and power constraints block 58 is used by the supervisory controller 50 to ultimately create two one-sided power vectors, i.e., a positive power vector and a negative power vector for methods 100 (FIG. 5) and 100A (FIG. 6). In addition to receiving the total torque request (arrow TQ), the motor and power constraints block 58 receives total power limits, i.e., both maximum and minimum (Max/Min), from a closed-loop/feed-forward voltage and a voltage and current control system block 51. Block 51 in turn may determine such total power limits using a set of electrical limits 60 having values that may be calibrated or adjusted in real time, e.g., in response to temperature. The electrical limits 60 may include battery power limits (PL), battery voltage limits (VL), and battery current limits (IL) in the illustrated embodiment. Thus, block 58 is made aware, via operation of the voltage and current control system block 51, of the present power capabilities of the shared battery pack 16 of FIG. 1. Block 58 is then used to constrain the total torque vector T to the remaining power in the battery pack 16.

Outputs from the motor and power constraints block 58 may include a constrained axle (torque) commanded vector and a constrained commanded power vector, i.e., the total torque and power vectors available for distribution to the various electric motors 114E once the electrical limits 60 have been properly accounted for. Thus, the example methods 100 and 100A described below include applying a calibrated set of motor torque constraints to the total torque vector T to derive the open-loop toque commands. A power distribution block 59, the functions of which are detailed below with reference to FIGS. 5 and 6, receives this information from motor and power constraints block 58, along with the electrical limits 60, and ultimately distributes a maximum and minimum power limit to the corresponding MCPs 25, e.g., MCP-1, MCP-2, ..., MCP-N, with the power limits being a motor-specific commanded power vector.

Within the MCPs 25 of FIG. 2, corresponding control logic 250L(1), 250L(2), ..., 250L(N) receives the respective open-loop axle torque command and corresponding commanded Max and Min power vectors. Control logic 250L(1), for instance, may use a fast actuator control block 62(1) to receive and process the open-loop axle torque command for MCP-1 to derive a corresponding power level, and a single motor constraint block 64(1) to adjust the corresponding power level in accordance with the motor-specific commanded power vector, i.e., the Max/Min power limits. Block 64(1) then outputs a final motor torque command to its controlled electric motor, e.g., electric motor 114.

As part of its programmed functionality, the power distribution block 59 upstream of the MCPs 25 is configured to calculate and output respective maximum and minimum power limits for each of the respective electric motors 114E shown in FIG. 1. That is, block 59 distributes a portion of the output from block 58 to each individual electric motor 114E situated on or powering the various drive axle 119s, 19-1, and 19-2 of FIG. 1, which is added to the original open-loop/feed-forward command from block 56. This ensures the original total torque request (arrow TQ) is honored even during cases in which power from the shared battery pack 16 of FIG. 1 is recirculated, while any remaining battery power is distributed for use by the individual electric motors 114E and associated axle controls without violating total battery power constraints. The supervisory controller 50 thus ensures that each electric motor 114E, upon receiving the open-loop torque command from block 56, will not draw too much or too little power from the shared battery pack 16.

Figure 4:
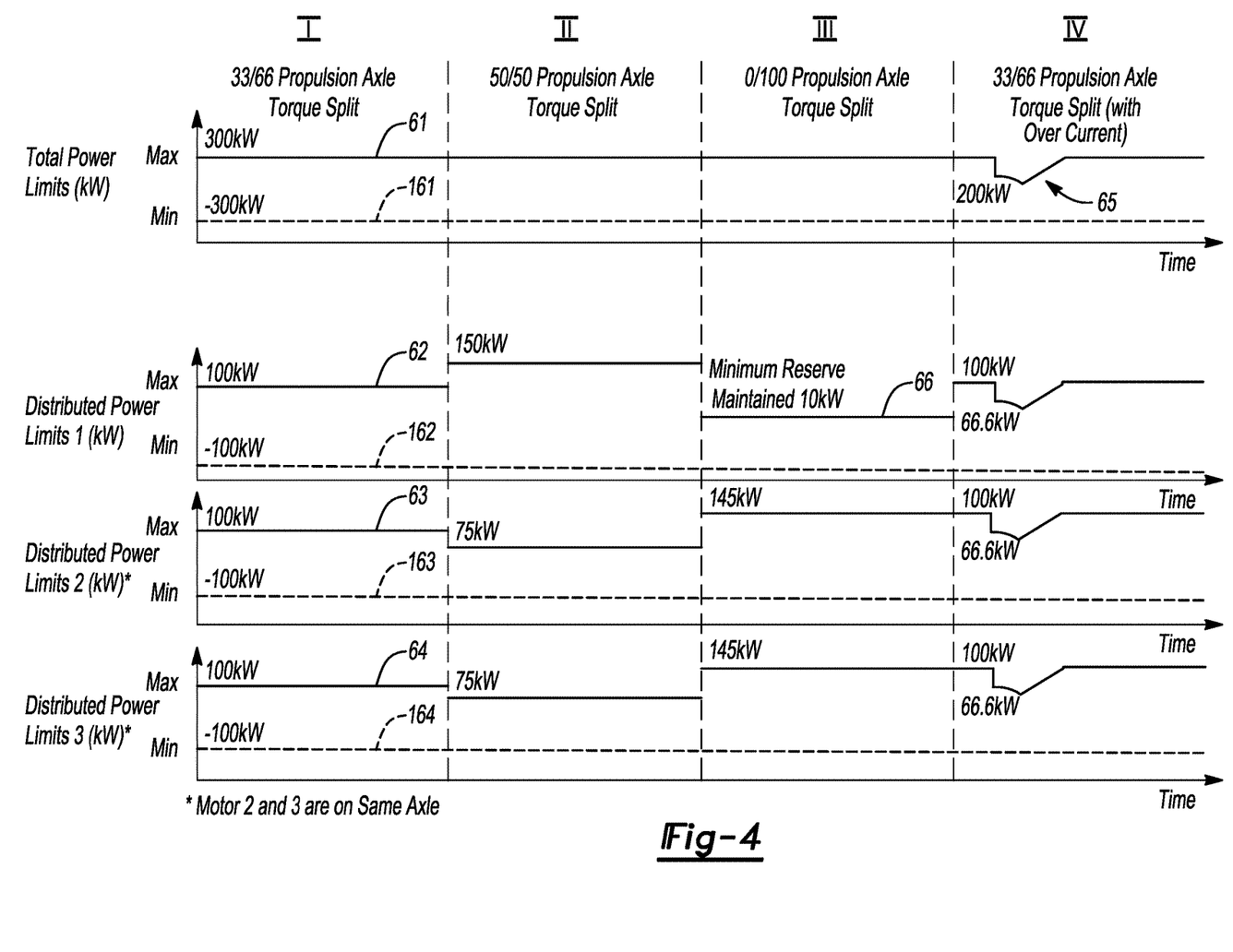
FIG. 4 is a schematic time plot of an exemplary power distribution scenario in accordance with the present method, with time depicted on several horizontal axes and battery power in kilowatts (kW) depicted on several corresponding vertical axes.

Referring briefly to FIG. 4, a representative discharge example is depicted for four representative torque split scenarios: (I) a 33/66 propulsion axle torque split, (II) a 50/50 propulsion axle torque split, (III) a 0/100 propulsion axle torque split, and (IV) a 33/66 propulsion axle torque split with an overcurrent condition. Trace 65 of the latter scenario (IV) is indicative of a case in which other control logic of the controller 50 may affect power limits, with handling of an overcurrent condition being just one example of this.

In this example, two electric motors 114E of FIG. 1 are used to power the rear road wheels 15R, i.e., the electric propulsion motors 14-1 and 14-2 of FIG. 1. In torque split scenarios I-IV, the ratio is used to represent allocation of total drive torque to the front road wheels 15F of FIG. 1 and the rear road wheels 15R, e.g., a 33/66 torque split corresponds to 33% and 66% of total torque being allocated to the front and rear road wheels 15F and 15R, respectively. Again as noted briefly above, some torque may be generated by an internal combustion engine (not shown) in optional hybrid embodiments, and thus the torque distribution is not necessarily solely electric motor torque.

Total positive and negative power limits in kW are represented as +300 kW and −300 kW in respective traces 61 and 161, with 300 kW being arbitrary and used solely for illustrating the present teachings. Traces 62 and 162 represent power limits distributed to the electric propulsion motor 114 driving the front drive axle 119 of FIG. 1. Similarly, traces 63 and 163 represent power limits distributed to the electric machine 14-1 driving the rear half axle 19-1 of FIG. 1, with traces 64 and 164 likewise representing power limits distributed to the electric propulsion motor 14-2. Within the 0/100 scenario, i.e., scenario (III), trace 66 represents a positive minimum power reserve that is maintained in accordance with the disclosure, which in this non-limiting example is 10 kW. Other embodiments for use with the motor vehicle 10 of FIG. 1 may use a different power reserve, e.g., 5 kW or more, and thus 10 kW is non-limiting and exemplary.

Referring to FIGS. 5 and 6, the methods 100 and 100A may be used for distributing electrical power from the shared battery pack 16 shown in FIG. 1 to the electric motors 114E of the electric powertrain 11, with the electric motors 114E being electrically connected to the shared battery pack 16 and locally controlled by a respective one of the MCPs 25 (see FIGS. 2 and 3).

Method 100 of FIG. 5 depicts an exemplary embodiment for control of a representative discharging case in which the shared battery pack 16 of FIG. 1 is actively discharging to provide electrical power to the various electric motors 114E, and describes in more detail the particular operation occurring primarily in the distribution block 59 of FIG. 3. Beginning at block B102, the supervisory controller 50 receives the input signals (arrow $CC_I$ of FIG. 1), which include the total torque request (arrow TQ) of the electric powertrain 11 and the set of electrical limits 60 of the shared battery pack 16.

As part of block B102, the controller 50 may calculate a motor torque command vector after applying linear and non-linear constraints from block 58 of FIG. 3. Assuming representative motors and corresponding axles A, B, and C, a possible motor torque command vector is represented as [A, B, C]. A constrained power limit of 150 Nm, itself exemplary and non-limiting, may be expressed as [−50, 100, 100] Nm, which corresponds to −50 Nm for motor/axle A and 100 Nm each for motors/axles B and C. The method 100 then proceeds to block B104.

At block B104, the supervisory controller 50 of FIG. 1 ultimately determines an open-loop torque command, i.e., the output of block 56 in FIG. 3, for each respective one of the electric motors 114E. This occurs in response to the input signals (arrow $CC_I$). As part of this approach, the controller 50 may calculate a commanded discharge power vector from commanded motor torques and current motor speeds. In keeping with the above 150 Nm example where [A, B, C]=[−50, 100, 100] Nm, the output of block B104 may be expressed as [A, B, C]=[−10, 20, 20] kW, which is referred to below as a commanded battery power (a vector). The method 100 then proceeds to block B106.

At block B106, the supervisory controller 50 next calculates the maximum discharge power [MaxPwr], also a vector, from the commanded battery power vector of block B104. In the above example, in which a representative 10 kW power reserve is maintained for the purpose of illustration, [A, B, C]=[0, 20, 20] kW. That is, the commanded discharge power vector [−10, 20, 20] kW has sufficient reserve for motors/axles B and C, each at 20 kW, while 10 kW is added to the −10 kW value of motor A to achieve 0 kW for motor/axle A in the [0, 20, 20] kW maximum discharge power vector.

The method 100, and its analog, method 100A described below, thus includes determining, via the supervisory controller 50 in response to the total torque request (arrow TQ) and the electrical limits 60, a maximum (method 100) and a minimum (method 100A) power limit of each respective one of the electric motors 114E, with the maximum and minimum power limits having a power reserve needed for executing a predetermined torque operation, e.g., 10 kW in this example. The method 100 then proceeds to block B108.

Block B108 entails comparing the commanded maximum discharge power to a total battery maximum power limit. The commanded discharge power in the above example is the sum of the vector components [0, 20, 20] kW, i.e., 40 kW. The method 100 proceeds to block B109 when the commanded maximum discharge power exceeds the total maximum battery power, and to block B110 in the alternative when the commanded maximum discharge power does not exceed the total maximum battery power.

Block B109 is arrived at from block B108 when the commanded maximum discharge power exceeds the total maximum battery power. In the above example, the commanded maximum power is 40 kW. Assuming for the sake of illustration that the total maximum battery power is 30 kW, block B109 would set the commanded maximum discharge power, i.e., [A, B, C]=[0, 20, 20] kW, as the maximum power limit for the discharge. The method 100 then proceeds to block B118.

At block B110, which is arrived at from block B108 when the commanded maximum discharge power is less than the total maximum battery power, e.g., 40 kW<50 kW in an example in which total maximum battery power is 50 kW, the supervisory controller 50 calculates a minimum reserve discharge power vector to inject into the commanded discharge power vector. For example, the supervisory controller 50 may apply a 5 kW power reserve [A, B, C]=[5, 5, 5] kW for each electric motor 114E. Thus, the above-noted commanded maximum power, i.e., [A, B, C]=[0, 20, 20], is adjusted to [A, B, C]=[5, 20, 20] kW, with the sum referred to hereinafter as a "commanded plus reserve maximum power". The method 100 then proceeds to block B112.

At block B112, the supervisory controller 50 determines if the commanded plus reserve maximum power exceeds the total battery maximum power. Here, the commanded maximum power is the sum of [5, 20, 20] kW, i.e., 45 kW. Assuming the same 50 kW exemplary battery maximum power used above, the supervisory controller 50 proceeds to block B114. However, the supervisory controller 50 proceeds to block B113 in the alternative when the commanded maximum power exceeds the battery maximum power. Using a different example satisfying this latter comparison, the sum [15, 20, 20] kW=55 kW would exceed 50 kW, thus leading the supervisory controller 50 to proceed to block B113.

At block B113, the supervisory controller 50 calculates a normalized vector from the commanded maximum power vector. For instance, the output of block B113 [0, for a vector [0, 20, 20] could be normalized (i.e., to 1) as a Normalized Vector [A, B, C]=[0, 0.5, 0.5] in a representative embodiment. The method 100 then proceeds to block B115.

Block B114, arrived at from block B112 when the commanded plus reserve maximum power is less than the total battery power limit, includes calculating a normalized vector from the commanded power vector. As such, block B114 is analogous to block B113. Using a nominal [0, 20, 20] kW example, such a normalized vector would be [0, 0.5, 0.5]. The method 100 then proceeds to block B116.

At block B115, the supervisory controller 50 adds the sum of the commanded maximum power, e.g., [0, 20, 20] kW in the above example, to a normalized value. The normalized value, also used in block B116 as explained below, is determined by multiplying the normalized vector, e.g., [0, 0.5, 0.5], by the difference (Total Maximum Power−(Commanded Maximum Power). In the above example, this translates to [0, 0.5, 0.5]*(50−40)=[0, 25, 25] kW. Thus, the output of block B116 is [A, B, C]=[0, 25, 25] kW. The method 100 then proceeds to block B118.

At block B116, the supervisory controller 50 next adds the sum of the commanded and reserve maximum power, e.g., [0, 20, 20] kW+[5, 0, 0] kW in the above example, to a normalized value. The normalized value is determined by multiplying the normalized vector, e.g., [0, 0.5, 0.5], by (Total Maximum Power−(Commanded+Reserve Maximum Power). In the above example, this translates to [0, 0.5, 0.5]*(50−(40+5))=[5, 22.5, 22.5] kW. The output of block B116 is [A, B, C]=[5, 22.5, 22.5] kW in this illustrative example. Thus, blocks B114 and B116 together determine how to allocate the 5 kW example power reserve, in this instance allocating half of the power reserve to motor B, half to motor C, and none to motor A. The method 100 then proceeds to block B118.

Block B118 is arrived at from blocks B109, B115, or B116 depending on the result of the block B108 and B112 comparisons. At block B118, the supervisory controller 50 distributes the final axle maximum power limits according to the limits output from blocks B109, B115, or B116, i.e., [A, B, C]=[0, 20, 20] kW, [0, 25, 25] kW, or [5, 22.5, 22.5] kW, respectively, in keeping with the FIG. 5 example use scenario. Thus, the methods 100 and 100A include transmitting the open-loop torque command and the maximum and minimum power limits to the respective MCPs 25 to control the torque operation.

Referring briefly to FIG. 6, method 100A is analogous to method 100 of FIG. 5 for a minimum power/charging scenario. Thus, blocks B102A-B118A are analogous to blocks B102-B118 as described above, with various sign differences as noted in the following summary description. For instance, block B102A operates in the same manner as block B102, and thus includes calculating a motor torque command vector after applying linear and non-linear constraints. The method 100A then proceeds to block B104A.

Block B104A includes calculating a commanded charging power vector from commanded motor torque commands and current motor speeds, as opposed to calculating a commanded discharge power vector as in previously described block B102 of FIG. 5. The method 100A then proceeds to block B106A.

At block B106A, the supervisory controller 50 calculates the minimum charging power [MinPwr] vector from the commanded battery charging power vector of block B104A. The method 100A then proceeds to block B108A.

Block B108A entails comparing the commanded minimum charging power to the total battery minimum charging power limit to determine whether the commanded minimum power is less than the total battery minimum charge power limit. The method 100A proceeds to block B109A when the commanded minimum charging power exceeds the total minimum battery power, and to block B110A in the alternative when the commanded minimum charging power is less than the total minimum battery power.

Block B109A is arrived at from block B108A when the commanded minimum charging power is less than the total minimum battery power. At block B109A, the supervisory controller 50 selects the commanded minimum charging power and proceeds to block B118A.

At block B110A, which is arrived at from block B108A when the commanded maximum charging power exceeds the total minimum battery power, the controller 50 includes a minimum reserve charge power vector in the commanded charge power vector. The method 100A then proceeds to block B112A.

At block B112A, the supervisory controller 50 determines if the commanded plus reserve minimum power is less than the total battery minimum power. The controller 50 proceeds to block B113A when the commanded maximum charging power is less than the minimum battery power, with the controller 50 instead proceeding to block B114A when the commanded plus reserve minimum charging power exceeds the total battery minimum power.

At blocks B113A and B114A, the supervisory controller 50 calculates a normalized vector from the commanded minimum charge power vector. The method 100A then proceeds to block B115A from block B113A, and to block B116A from block B114A.

At block B115A, the supervisory controller 50 adds the sum of the commanded minimum power to a normalized value, analogously with above-described block B115. The normalized value, also used in block B116A as explained below, is determined by multiplying the normalized vector by the difference between the total minimum battery power and the commanded minimum charging power. The method 100A then proceeds to block B118A.

At block B116A, the supervisory controller 50 adds the sum of the commanded minimum battery power and reserve minimum power to a normalized value. The normalized value, also used in block B115A as explained above, is determined by multiplying the normalized vector, e.g., [0, 0.5, 0.5], by (Total Minimum Power−(Commanded Minimum Power+Reserve Minimum Power). The method 100A then proceeds to block B118A.

Block B118A is arrived at from blocks B109A, B115A, or B116A depending on the result of the block B108A and B112A comparisons. At block B118A, the supervisory controller 50 distributes the final axle maximum power limits according to the limits output from blocks B109A, B115A, or B116A. The method 100 and 100A, or a different strategy, may then include controlling the torque operation via the respective MCPs 25 in response to the open-loop torque commands and the maximum and minimum power limits for the respective electric motors 114E.

Using the above methods 100 and 100A of FIGS. 5 and 6 in conjunction with the control logic 50L of FIG. 3, the supervisory controller 50 of FIGS. 1 and 2 is able to distribute power from a shared power supply, e.g., the battery pack 16, across multiple distributed motor controllers, as represented herein by the MCPs 25 of FIG. 2. The distributed approach described herein simplifies individual motor driveline controls, as will be appreciated by those skilled in the art, and ensures adequate power reserves for performing individual motor-level control actions.

Representative fast actuator control actions such as active damping, lash control, or wheel flare mitigation are noted herein as non-limiting examples, with various other control actions possibly being performed by the individual electric machines 14E in different embodiments. Thus, the present approach allows each respective MCP 25 to independently perform fast actuator control actions by determining, via the supervisory controller 50, an electric power reserve that is then intelligently distributed between the MCPs 25 based on a torque request vector to each respective electric machine 14E. These and other benefits will be readily appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method for distributing electrical power to a plurality of electric motors in an electric powertrain in which the electric motors are electrically connected to a shared power supply and locally controlled by respective motor control processors (MCPs), such that each one of the electric motors is controlled by a corresponding one of the MCPs, the method comprising:

receiving input signals via a supervisory controller, wherein the input signals include a total torque request of the electric powertrain and a set of electrical limits of the shared power supply, wherein the set of electrical limits includes a power limit of the shared power supply, a voltage limit of the shared power supply, and a current limit of the shared power supply;

determining an open-loop torque command for each respective one of the electric motors, via the supervisory controller, in response to the input signals;

determining, via the supervisory controller in response to the total torque request and the set of electrical limits, maximum and minimum power limits of each respective one of the electric motors, the maximum and minimum power limits having a calibrated power reserve margin for executing a predetermined torque operation; and transmitting the open-loop torque command and the maximum and minimum power limits to the respective MCPs to thereby distribute power from the shared power supply to each respective one of the electric motors based on the maximum and minimum power limits to each of the respective MCPs to control the predetermined torque operation.

2. The method of claim 1, wherein determining the open-loop torque command for each respective one of the electric motors includes calculating a total torque vector for the electric powertrain in response to the input signals, the total torque vector having a lateral torque component and a longitudinal torque component, and applying a calibrated set of motor torque constraints to the total torque vector to derive the open-loop torque command.

3. The method of claim 1, wherein the electric motors are alternating current (AC) motors, the shared power supply is a direct current (DC) power supply, the electric powertrain includes a plurality of power inverters, and the respective MCPs are each connected to a respective one of power inverters, the method further comprising: controlling the predetermined torque operation via the respective MCPs in response to the open-loop torque command and the maximum and minimum power limits.

4. The method of claim 3, wherein the electric powertrain is part of a motor vehicle having road wheels respectively driven by a corresponding one of the AC motors, and wherein controlling the predetermined torque operation via the respective MCPs includes controlling a fast actuator control action of the motor vehicle.

5. The method of claim 4, wherein controlling the fast actuator control action of the motor vehicle includes controlling an active damping maneuver, a lash mitigation maneuver, and/or a wheel-flare mitigation maneuver.

6. The method of claim 4, wherein the shared power supply is a high-voltage propulsion battery pack, and the calibrated power reserve margin for executing the predetermined torque operation is at least 5 kW.

7. An electric powertrain comprising:
a shared power supply;

a plurality of drive axles;
a plurality of electric motors, each electric motor of the plurality of electric motors being electrically connected to the shared power supply and arranged on a respective one of the drive axles, wherein the shared power supply is configured to deliver power to each of the electric motors;
a plurality of motor control processors (MCPs), each MCP of the plurality of MCPs being configured to control a dynamic state of a respective one of the electric motors; and
a supervisory controller in communication with the plurality of MCPs, wherein the supervisory controller is configured to:
receive input signals, including a total torque request of the electric powertrain and a set of electrical limits of the shared power supply, wherein the set of electrical limits includes a power limit of the shared power supply, a voltage limit of the shared power supply, and a current limit of the shared power supply;
determine an open-loop torque command for each respective one of the electric motors in response to the input signals;
determine, in response to the total torque request and the set of electrical limits, maximum and minimum power limits of each respective one of the electric motors, the maximum and minimum power limits having a calibrated power reserve margin for executing a predetermined torque operation; and
transmit the open-loop torque command and the maximum and minimum power limits to the respective MCPs to thereby distribute the power from the shared power supply to each respective one of the electric motors based on the maximum and minimum power limits to each of the respective MCPs to control the predetermined torque operation.

8. The electric powertrain of claim 7, wherein the supervisory controller is configured to determine the open-loop torque command for each respective one of the electric motors by calculating a total torque vector for the electric powertrain in response to the input signals, the total torque vector having a lateral torque component and a longitudinal torque component, and thereafter applying a calibrated set of motor torque constraints to the total torque vector to derive the open-loop torque command.

9. The electric powertrain of claim 7, wherein the electric motors are alternating current (AC) motors, the shared power supply is a direct current (DC) power supply, the electric powertrain includes a plurality of power inverters, and the respective MCPs are each connected to a respective one of power inverters, wherein the MCPs are configured to control the predetermined torque operation in response to the open-loop torque command and the maximum and minimum power limits.

10. The electric powertrain of claim 9, wherein the electric powertrain is part of a motor vehicle having road wheels respectively driven by a corresponding one of the AC motors, and wherein the MCPs are configured to control the predetermined torque operation by controlling a fast actuator control action of the motor vehicle.

11. The electric powertrain of claim 10, wherein the plurality of drive axles includes a pair of half-axles each connected to a respective one of the road wheels, wherein a corresponding one of the electric motors is configured to power a respective one of the pair of half-axles.

12. The electric powertrain of claim 10, wherein the fast actuator control action includes controlling an active damping maneuver, a lash mitigation maneuver, and/or a wheel-flare mitigation maneuver.

13. The electric powertrain of claim 10, wherein the shared power supply is a high-voltage propulsion battery pack having a voltage capability of 300V or more, and the calibrated power reserve margin for executing the predetermined torque operation is at least 5 kW.

14. A supervisory controller for an electric powertrain having multiple electric motors electrically connected to a shared power supply and locally controlled by respective motor control processors (MCPs), such that each one of the multiple electric motors is controlled by a corresponding one of the MCPs, the supervisory controller comprising:
a processor; and
memory on which is recorded instructions for distributing power from the shared power supply to the multiple electric motors, wherein execution of the instructions by the processor is configured to cause the supervisory controller to:
receive input signals, including a total torque request of the electric powertrain and a set of electrical limits of the shared power supply, the set of electrical limits including a power limit of the shared power supply, a voltage limit of the shared power supply, and a current limit of the shared power supply;
determine an open-loop torque command for each respective one of the electric motors in response to the input signals;
determine, in response to the total torque request and the set of electrical limits, maximum and minimum power limits of each respective one of the electric motors, the maximum and minimum power limits having a calibrated power reserve margin for executing a predetermined torque operation; and
transmit the open-loop torque command and the maximum and minimum power limits to the respective MCPs to thereby distribute power from the shared power supply to each respective one of the electric motors based on the maximum and minimum power limits to each of the respective MCPs to control the predetermined torque operation.

15. The supervisory controller of claim 14, wherein execution of the instructions is configured to cause the supervisory controller to determine the open-loop torque command for each respective one of the electric motors by calculating a total torque vector for the electric powertrain in response to the input signals, the total torque vector having a lateral torque component and a longitudinal torque component, and by applying a calibrated set of motor torque constraints to the total torque vector to derive the open-loop torque command.

16. The supervisory controller of claim 14, wherein the open-loop torque command and the maximum and minimum power limits to the respective MCPs to are configured to cause the MCPs to control the predetermined torque operation an active damping maneuver, a lash mitigation maneuver, or a wheel-flare mitigation maneuver.

17. The method of claim 1, wherein the supervisory controller is configured to calculate a total required power level and distribute the calculated total required power level to each of the MCPs.

18. The electric powertrain of claim 7, wherein the supervisory controller is configured to calculate a total required power level and distribute the calculated total required power level to each of the MCPs.

\* \* \* \* \*